United States Patent Office 2,839,465
Patented June 17, 1958

2,839,465
WATER DISPERSIBLE CORROSION INHIBITOR

Loyd W. Jones, Tulsa, Okla., assignor to Pan American Petroleum Corporation, a corporation of Delaware No Drawing. Application February 4, 1953
Serial No. 335,161

13 Claims. (Cl. 252—8.55)

This invention relates to corrosion inhibitors and more particularly to dispersing oily inhibitors in water.

Many of the more effective corrosion inhibitors are of an oily nature; that is, they are soluble in oil and insoluble in water. Examples of such compounds are the imidazoline derivatives sold under the Kontol trademark, and the amine complexes with various organic acids described in my co-pending U. S. patent application No. 288,705 filed May 19, 1952, now Patent No. 2,756,211. The reaction products of formaldehyde with amines, and the rosin amines and their derivatives are other examples of oil soluble and water insoluble corrosion inhibitors. Many corrosive systems are predominately aqueous in nature, some of them containing no oil at all. Several means have been tested for dispersing the oily corrosion inhibitors in these systems. One means has consisted of treating the inhibitors with ethylene oxide to add polyoxyethylene chains to the inhibitor molecule in order to increase water solubility. This method has been fairly successful for dispersing the oily inhibitors in fresh water but has been incapable of dispersing these materials in brines such as those encountered in some oil fields. Since oil field waters are almost always brines, the failure of the ethylene oxide treated inhibitor to mix readily with brines has been a serious defect of such inhibitors.

Theoretically, it should be possible to disperse oily inhibitors in brines by the use of non-ionic emulsifiers. Many of these materials have been found to be highly effective for dispersing hydrocarbons in brines, but generally they are ineffective for dispersing oily inhibitors.

In treating oil wells producing large volumes of brine, it would be highly desirable to employ the well production as the diluent normally used prior to introducing the inhibitor into the well. Mixing of the inhibitor with the well production introduces two problems, however. First, is the previously mentioned problem of dispersing the inhibitor in oil field brines. Second, is the problem of preventing concentration of the oil soluble inhibitor in the oil phase of the well production.

In view of the foregoing problems and difficulties, it is an object of this invention to provide a method of treating corrosive aqueous systems with an oily corrosion inhibitor. Another object is to provide a method for dispersing an oily inhibitor in brines. An additional object is to provide a corrosion-inhibiting composition containing an oily corrosion inhibitor, the composition being of such a nature that the inhibitor will disperse in a brine into which the composition is mixed. A specific object of the invention is to provide a corrosion inhibiting composition containing an oily inhibitor, which composition when diluted by a mixture of oil and brine causes the inhibitor to be dispersed principally in the aqueous phase.

In general, I accomplish the objects of my invention by mixing the oily inhibitor with at least three other materials: an oil, a mutual solvent for oil and water, and certain polyglycol or polyglycerol ethers of non-aromatic alcohols employed as dispersing agents. By way of example, the composition may consist of about 50 percent by volume of a corrosion inhibitor such as the octadecylamine salt of fatty acids, about 40 percent by volume of an oil such as kerosene, about 5 percent by volume of a mutual solvent, such as ethanol, for oil and water and about 5 percent by volume of a dispersing agent such as the ether of lauryl alcohol with a polyglycol containing about 20 ether linkages. To this mixture, about 2 percent of water may be added to reduce the viscosity and to decrease the turbidity of the composition. It will be observed that the composition consists of four essential ingredients and another which is highly desirable but optional. The four essential constituents are: first, a dispersing agent, second, an oil, third, a mutual solvent for oil and water, and fourth, the oily inhibitor. The optional fifth ingredient is water. These constituents will now be considered in more detail.

DISPERSING AGENT

The dispersing agent should belong to the class of water soluble non-ionic ester-free ethers of an alcohol and a polyglycol or polyglycerol. All members of this broad family are not operable, however. In order for the material to be effective for my purposes, the alcohol portion should be non-aromatic since alkylated phenols have been found to produce dispersing agents ineffective in brines. The alcohol may, however, contain an aromatic ring so long as the hydroxyl group is not attached to it. Preferably, the alcohol should be a straight chain saturated or unsaturated material such as lauryl or oleyl alcohol. The alcohol should contain at least twelve carbon atoms to provide sufficient oil solubility in this portion of the molecule. To form the most effective dispersing agent, preferably the alcohol should contain no more than about 20 carbon atoms since a larger number of carbon atoms results in decreased oil solubility. In general, the thioethers can also be employed, the limits outlined for the alcohols being observed for analogous mercaptans. The polyglycol or polyglycerol portion of the dispersing agent should contain at least four ether linkages in order to provide sufficient water solubility to cause concentration of the dispersing agent at oil-water interfaces. Dispersing agents prepared with such limited numbers of ether linkages are operable to a limited extent but many more ether linkages should be present for best results. Polyglycols are much more generally employed than polyglycerols. It is often more convenient to refer to the polyglycol portion of a dispersing agent as a polyoxyethylene chain. Thus, it can be said that the dispersing agent should contain at least five oxyethylene groups and preferably at least 10. Normally, not more than about 30 oxyethylene groups are employed although dispersing agents containing larger members of oxyethylene groups are operable to at least a limited extent.

The dispersing agents may be conveniently represented by the formula RXW wherein R is a non-aromatic hydrocarbon radical containing at least 12 carbon atoms, X is oxygen or sulfur, and W is a polyglycol or polyglycerol portion containing at least 4 ether linkages. The term R in the formula is intended to be broad enough to include the operable alcohols and mercaptans described above. Thus, the term "non-aromatic hydrocarbon radical" includes radicals which contain an aromatic group so long as this group is not attached to the element X in the formula. The term W is intended to be broad enough to include operable forms of the polyglycols (polyoxyethylene chains) and polyglycerols described above.

A preferred class of dispersing agents may be represented by the formula R'OW' in which R' is a straight-chain hydrocarbon radical containing from 12 to 20 carbon atoms, O is oxygen, and W' is a polyoxyethylene chain containing between about 10 and 30 oxyethylene groups. A highly effective example of the class of dispersing agents just described is the lauryl alcohol ether of a polyoxyethylene chain containing about 20 oxyethylene groups. The concentration of the dispersing agent in the water dispersible compositions should amount to at least about 2 percent by volume of the composition if effective dispersion is to be obtained. An upper limit of about 10 percent by volume is normally observed for economic reasons, but 15 percent has been employed with good results. The dispersing agent is normally employed in a concentration of about 4 to 6 percent by volume of the corrosion-inhibiting composition.

OIL

In general, most petroleum oils may be employed with at least fair results. It is highly preferred, however, to employ a refined petroleum fraction such as kerosene or refined mineral oil. The principal advantage of using such a refined product is to avoid the effects of impurities in crude oils. A particularly desirable class of oils is the class of distilled petroleum products since the distillation operation normally eliminates impurities which may cause difficulties. Of this class of distilled petroleum fractions, those having higher viscosities and lower flash points have been found to be most desirable since they eliminate fire hazards and seem to disperse more readily in water. A convenient test for the preferred group of distilled petroleum fractions is ASTM test D86-46 which describes the standard method for distillation analysis of petroleum fractions. The most desirable groups of oils are the distilled petroleum fractions having a 10 percent boiling point of at least about 400° F. in the ASTM distillation. The oil in the corrosion inhibiting composition appears to have two functions. One of the functions is to cooperate with the inhibitor to form a more effective film on the surface of metal to be protected. The other function is a diluting action which is apparently essential to obtain effective dispersion of the inhibitor in the aqueous phase of the system to be protected.

The oil should be present in the composition in an amount equal to at least about 10 percent by volume of the composition. This amount of oil seems to be sufficient to cooperate with the inhibitor in forming effective films. The oil in these concentrations also produces satisfactory dispersions of oily inhibitors in the aqueous system. It is normally preferred to use about 30 to 60 percent by volume of oil since this amount is more than adequate for coating purposes and gives very good dispersions of inhibitor, but at the same time avoids excessive volumes of the inhibiting composition which would result from the use of larger percentages of oil. Generally, an upper limitation of about 80 percent by volume of oil should not be exceeded for satisfactory operation.

It has been found that aromatic hydrocarbons such as benzene, toluene and xylene can serve as the oil portion of the inhibitor composition. Such materials also seem to fulfill the requirements of a mutual solvent for oil, inhibitor and dispersing agent. Thus, by using aromatic hydrocarbons, the mutual solvent can be omitted and operable dispersions still can be obtained with or without water as a constituent of the composition. Better and more stable dispersions are obtained, however, if a mutual solvent such as methanol is also employed.

MUTUAL SOLVENT

The real problem in selecting a mutual solvent is to find one which is a solvent for both the oil and the dispersing agent. It has been found, however, that a simpler rule to follow is to select a mutual solvent for oil and water. The dispersing agent, being highly water soluble, is also soluble in these mutual solvents for water and oil. Preferably, the mutual solvent should be miscible in all proportions, or nearly so, with both oil and water. Suitable mutual solvents include materials, such as ethers, ketones, esters and alcohols. As specific examples of the aforesaid classes of mutual solvents, there may be mentioned acetone, methyl acetate, p-dioxane, the 2-alkoxyethanols sold under the trademark "Cellosolves," and the lower molecular weight alcohols such as methanol, ethanol and isopropyl alcohol, said alcohols representing the preferred class of mutual solvents which may be employed in carrying out my invention. In this connection, 1-butanol has been successfully employed but is not sufficiently water soluble to produce dispersions as stable as those formed by use of the alcohols having three or less carbon atoms per molecule. The mutual solvent performs several functions. First, it aids in forming a homogeneous mixture of the water soluble dispersing agent, the oil and the oily inhibitor. Second, it aids in the dispersion of the inhibitor into the water contacting the surface to be protected. In this regard, its function is similar, apparently, to the diluting action of the oil previously referred to. Third, the mutual solvent reduces the viscosity, gel strength and pour point of the corrosion inhibiting composition, thus facilitating handling of this composition. Methanol is a preferred mutual solvent which is easily obtained in almost anhydrous conditions.

The mutual solvent should be employed in an amount of at least about 2 percent by volume of the composition in order to obtain an appreciable effect. As much as 20 percent of the mutual solvent has been employed without ill effects. However, this large quantity of solvent increases the cost and the volume of the composition to such an extent that an upper limit of 10 percent is generally observed. Mutual solvents are normally employed in a concentration of about 4 to 6 percent by volume of the composition.

INHIBITOR

The inhibitor may be any of the oily corrosion inhibitors known in the art. Several of these materials have been previously mentioned. Others will occur to those skilled in this art. A preferred class of inhibitors is the class of amine complexes with organic acids, described in my co-pending U. S. patent application 288,705, referred to above. A particularly desirable amine-acid complex for use in my water dispersible composition is the complex derived from Armour and Company's Duomeen T and Alox Corporation's 425 acids. Duomeen T has the formula $R''NH(CH_2)_3NH_2$ wherein $R''$ is a straight chain hydrocarbon radical containing 16 to 18 carbon atoms. The Alox 425 acids are produced from a normally liquid fraction of petroleum by liquid-phase partial oxidation of the latter. Another highly desirable amine acid complex is formed between Duomeen T and VR-1 acids obtainable from Rohm and Haas. The VR-1 acids are polybasic acids obtained as a by-product from the caustic fusion of castor oil. They have an average molecular weight of about 1000 and an average of about 2 carboxylic acid groups per molecule. They are conveniently described as the non-volatile residue, containing long-chained carboxylic acids, remaining from the vacuum distillation of by-product acids obtained in the preparation of sebacic acid from castor oil by treatment with alkali. These VR-1 acids are described in more detail in U. S. Patents 2,267,269 issued to Cheetham et al., and 2,471,230 issued to McKeever.

The inhibitor normally is employed in the water dispersible composition in a concentration of about 50 percent by volume. However, it can be employed in concentrations as high as 80 percent, or it can be diluted with either the oil or mutual solvent to a much lower concentration, possibly as low as about 10 percent, but preferably no lower than 30 percent. A concentration between 35 and 65 percent by volume is suggested as the most desirable range.

WATER

As previously noted, the water-dispersible composition is operable if it includes no water. Therefore, the lower limit of water content of the composition is zero. An upper limitation of about 3 percent water should be observed to avoid inversion into an oil-in-water type of emulsion with consequent increase of viscosity and gel strength. The preferred concentration is about 2 percent water. The principal effects of the water are to clarify the turbid composition and reduce its viscosity. The presence of a little water in the composition also seems to aid in the dispersion of the inhibitor into the water contacting the surface to be protected.

APPLICATION OF COMPOSITION

The principal application of my water-dispersible composition is to oil wells producing a substantial amount of water; that is, about 10 percent or more of the total production. The undiluted composition may be introduced into the annular space between the tubing and casing or through the tubing in a container with an orifice. It may also be introduced in undiluted form in a slowly soluble stick or pellet. It is preferred, however, to dilute the composition with water before introducing it into a well. The results of such dilutions are that the inhibitor reaches the bottom of the well much more quickly with less hold up, and more effectively covers exposed metal surfaces on the way down. Dilution also aids passage of the inhibitor through oil layers since if the inhibitor is dispersed in a continuous water phase, excessive dispersion of the oil soluble inhibitor in long oil columns is prevented. If the inhibitor is diluted before introduction into the well, it reaches the bottom of the well and starts up the tubing at a concentration much closer to the desired equilibrium concentration of inhibitor in the system to be treated. By such dilution, a larger volume is provided in case it is desired to introduce the inhibitor into the well over a longer period of time. The usual practice, however, is to introduce, in a batch, sufficient inhibitor to last for a period of a day or more.

If the water in the production from the well amounts to at least about 50 percent of the total production, the inhibitor can be mixed into the oil and water to avoid bringing water to the well from tanks or separators at some distance from the well. If the inhibitor is to be mixed into the total production, a simple procedure is to introduce the composition into a pot into which the well production enters at a tangent. The resulting swirling action is usually quite adequate to disperse the inhibitor in the aqueous phase. In normal practice, about one volume of inhibitor composition is mixed with about 5 to 10 volumes of production. The entire batch of diluted inhibitor is then washed down the annular space with about 10 to 20 or more volumes of production. This batch of materials apparently mixes into the liquids in the bottom of the well and is produced by the well at a fairly slow rate over a period of time, generally about equal to the period between treatments. In diluting the composition before use, an amount of water should be employed at least equal to the volume of inhibiting composition. If less water is employed, a thick viscous emulsion with considerable gel strength results, which is rather difficult to handle.

If the inhibiting composition is to be applied to surface systems such as water-disposal or water-flooding distribution systems, dilution is again advisable to obtain effective treatment near the point of injection by having a good dispersion in water when introduced into the system. The composition may be introduced in a single batch, but in surface equipment, it may be advisable to meter the liquid in almost continuously. A convenient means of introduction is to meter the inhibitor into the intake of a pump handling the water in the system. The inhibitor may be introduced down stream from the pump, however, due to its ready dispersibility in water.

Sufficient of the inhibiting composition is normally employed to provide an inhibiting concentration, in mildly corrosive systems of 10 to 20 p. p. m. by weight based on the total liquids in the system to be treated; that is, if the system contains both oil and water, the concentration should be based on the amount of both oil and water. If batch injection is employed every day, the total daily amount of liquids should be employed as a basis for calculating the amount of inhibitor to be used. A concentration of 100 to 200 p. p. m. is considered high for normal treatments. If a pretreatment is used to establish protection quickly, concentrations as high as 50 times the normal treating concentrations of 10 to 20 p. p. m., which will follow, are sometimes employed. The more usual pretreating concentrations are 10 to 20 times normal. Pretreatments usually last from three to seven days or slightly more and may be followed by an intermediate stage of treatments at concentrations about twice normal for a period approximately equal to that of the initial pretreatment. Pretreatments are seldom repeated although some advantage is to be gained thereby.

My invention will be better understood by consideration of the following examples.

Example I

A four-component composition was prepared as follows:

| Material: | Percent by volume |
|---|---|
| Inhibitor | 60 |
| Dispersing agent | 5 |
| Kerosene | 30 |
| Methanol | 5 |
| | 100 |

The inhibitor was the octadecyl amine-acid complex obtained by reacting the amine with acids derived by the liquid phase partial oxidation of a liquid petroleum fraction. The dispersing agent was an ether of lauryl alcohol and a polyoxyethylene chain containing about 23 oxyethylene groups. The composition was a slightly turbid solution at a temperature of 80° F. One part of this mixture was added to 9 parts of an aqueous solution containing about 9 percent by weight of sodium chloride and 1 percent by weight of calcium chloride. The mixture with the salt water was shaken by hand 50 times and the stability observed. Most of the inhibitor was still stably dispersed after 24 hours, but part of the kerosene had separated from the water phase. Part of the small amount of kerosene present also remained dispersed in the aqueous phase.

Example II

Compositions were made up according to Example I except that different dispersing agents were employed. Dispersion of each of these compositions in the same brine and in the same manner described in Example I was then attempted. The results are presented in Table I.

TABLE I

| Dispersing Agent | Type of Agent | Stability of Dispersion |
|---|---|---|
| Brij 35 | Ether of Lauryl alcohol and a polyglycol. | Dispersion stable after 72 hours. |
| Antara 210-LA | do | Do. |
| Antarox D-100 | Ether of oleyl alcohol and a polyglycol. | Dispersion stable after 24 hours. |
| Triton X-100 | Ether of alkylated phenol and a polyglycol. | Dispersion broke rapidly. |
| Antarox A-404 | do | Do. |
| Myrj 53 | Ester of stearic acid and a polyglycol. | Fair dispersion but broke in about 10 minutes. |
| Tween 20 | Ester of lauric acid and polyoxyethylene sorbitan. | Good dispersion but broke in about 10 minutes. |

So far as is known all the dispersing agents listed contain about 20 oxyethylene groups per molecule except Antarox A-404 which contains about 30 of these groups.

It will be noted that the polyglycol ethers of non-aromatic alcohols are all highly desirable dispersing agents, but that polyglycol ethers of alkylated phenols are not operable for dispersing oily inhibitors in brines. They are highly effective in fresh water but the dispersion fails when salt is added. The ester-type dispersing agents form dispersions which are sometimes very good except that they are too unstable in brines to permit use in most commercial applications.

Example III

A composition was prepared as described in Example I except that the inhibitor was Kontol 118, a solution of an imidazoline derivative in kerosene more fully described in U. S. Reissue Patent 23,227 Blair et al. Since the Kontol 118 already contained kerosene, no additional kerosene was added, the composition consisting of 90 percent by volume of Kontol 118 (combined inhibitor and kerosene) and 5 percent by volume each of the dispersing agent and methanol. When one part by volume of this composition was mixed with 9 parts by volume of the brine described in Example I, a good dispersion resulted which was still stable after 24 hours.

Example IV

Compositions were prepared as described in Example I except that various mutual solvents were employed. The resulting compositions and the types of dispersions formed when mixed with brine as described in Example I are tabulated in Table II.

TABLE II

| Mutual Solvent | Nature of Concentrate | Nature of Dispersion |
| --- | --- | --- |
| Ethanol | Non-viscous but slightly turbid. | Stable after 24 hours. |
| 1-Butanol | Clear non-viscous solution becoming turbid when cooled to about 80° F. | Dispersion not complete, but stable for about an hour. |
| Acetone | Opaque and thick. | Fair dispersion stable for several hours. |
| 2-Butoxyethanol (Butyl Cellosolve). | Clear non-viscous solution. | Fairly good dispersion stable for several hours. |

Example V

Compositions were prepared as described in Example I except that oils other than kerosene were employed. When medicinal mineral oil (liquid petrolatum) was employed, the resulting composition was surprisingly non-viscous and clear. The dispersion in salt water was stable, the mineral oil tending to remain dispersed better than kerosene. When crude oil from East Texas was employed, the resulting composition was very similar to the one prepared with kerosene, but the dispersion in salt water, while satisfactory for use, was not as complete or as stable as when kerosene was employed as the oil constituent.

Example VI

Water was added to the corrosion-inhibiting compositions described in Examples I through V inclusive. In every case, the amount of water was about 2 percent by volume of the resulting composition. In every instance the results were a decrease in viscosity and in turbidity of the compositions. The presence of water also seemed to produce an improvement in the dispersion in brine obtained when mutual solvents such as acetone and 1-butanol were employed.

When 3 percent water was added to the composition described in Example I, a slight increase in viscosity and a return of a slight turbidity occurred as if the solution, or water-in-oil type emulsion, was about to become an oil-in-water type of dispersion. Use of 5 percent water definitely caused the formation of a thick emulsion paste. When an amount of water was employed equal to the amount of the composition described in Example I, the result was an opaque, but fairly non-viscous dispersion of the composition in the water phase.

Example VII

A three-component composition was prepared consisting of about 60 percent by volume of the inhibitor and 5 percent by volume of the dispersing agent described in Example I, together with about 35 percent by volume of benzene. The aromatic hydrocarbon apparently performed the dual function of the oil and of the mutual solvent since the resulting composition was quite similar to those prepared with kerosene and an alcohol except that the dispersion of the inhibitor in salt water was not quite as complete or as stable as when kerosene and alcohol were employed. The composition was still satisfactory for commercial use, however.

Example VIII

To the four-component composition described in Example I, 2 percent by volume of water was added to form an inhibitor concentrate suitable for testing the dispersibility of the inhibitor in brine in the presence of crude oil. One part of the concentrate was added to 2½ parts of crude oil from the Anton-Irish Field in Texas and 2½ parts of a brine containing 10 percent sodium chloride by weight. The mixture was shaken thoroughly and allowed to stand. The oil separated in a few seconds leaving a brown opaque aqueous phase which appeared to be identical to the dispersions of inhibitor prepared in the absence of crude oil. Further tests with the aqueous dispersions prepared with and without crude oil included evaporating samples of the dispersions to dryness and analyzing by means of the infrared spectrograph. The weights of material remaining after evaporation and the spectrographic analysis both indicated the two dispersions were practically identical except for a slightly smaller concentration of inhibitor in brine in the presence of the crude oil. When all the constituents of the concentrate except the inhibitor were mixed with the crude oil and brine, a clear aqueous phase resulted, indicating again that the inhibitor is the material which disperses in the aqueous phase.

Example IX

To test the corrosion inhibiting ability of the water-dispersible composition, a five-component composition was prepared, containing the materials in the quantities indicated in Table III. The corrosion inhibitor was the complex of Duomeen T with VR-1 acids. The complex contained approximately equal parts by weight of the amine and acid components.

TABLE III

Material: Amount, percent by volume
Corrosion inhibitor _____ 50
Kerosene _____ 38
Brij 35 _____ 5
Methanol _____ 5
Water _____ 2

Total _____ 100

This composition was mixed into 800 ml. of an aqueous sodium chloride brine containing 5 percent by weight of the salt, and 16 ml. of kerosene in a one-liter bottle. The final concentration of the corrosion inhibitor in the mixture was 200 parts per million by weight. A tared polished mild steel test panel 1" x 1" x 1/16" was suspended in the brine by a metal rod from which the panel was insulated by plastic washers. The bottle was stoppered, but provision was made for a corrosive gas stream containing 98 percent air and 2 percent hydrogen sulfide to bubble through the liquids in the bottle. The gas stream was bubbled at a rate of ½ cubic foot per hour through the bottle in series with a duplicate and two duplicate controls lacking the inhibiting composition. The bottles were vigorously shaken for 15 consecutive minutes every two hours. After seven days exposure under these conditions at 100° F. the panels were removed from the bottles, dipped in dilute inhibited hydrochloric acid solution, rubbed lightly to remove adhering scale when necessary, rinsed in distilled water, dried and weighed. The two control panels lost 0.7109 and 0.6607 grams, an average of 0.6858. The two inhibited panels lost 0.0058 and 0.0045 grams, an average of 0.0052 gram. Thus, the inhibition was a little more than 99.2 percent, no pitting or local attack being visible. It is apparent from this test that the inhibitor remains highly effective when dispersed in the aqueous phase.

From the above description and examples, it will be observed that I have provided a method and composition for dispersing an oily corrosion inhibitor in an aqueous phase even when the aqueous phase is a brine and even when crude oil is present in an amount equal to the volume of the aqueous phase.

I claim:

1. A brine-dispersible corrosion-inhibiting composition comprising from about 10 to 80 percent by volume of an oil-soluble, water-insoluble corrosion inhibitor, from about 10 to 80 percent by volume of a distilled petroleum fraction, from about 2 to 10 percent by volume of a mutual solvent for water and the distilled petroleum fraction, and from about 2 to 10 per cent by volume of a dispersing agent having the formula ROW, wherein R is a non-aromatic hydrocarbon radical containing at least 12 carbon atoms, O is oxygen and W is a polyglycol containing at least 4 ether linkages.

2. A brine-dispersible corrosion-inhibiting composition comprising from about 10 to 80 percent by volume of a liquid, oil-soluble, water-insoluble corrosion inhibitor, from about 10 to 80 percent by volume of a distilled petroleum fraction, from about 2 to 10 percent by volume of a mutual solvent for water and said petroleum fraction, from about 2 to 10 percent by volume of a dispersing agent having the formula R'OW' wherein R' is a straight-chain hydrocarbon radical containing from 12 to 20 carbon atoms, O is oxygen, and W' is a polyoxyethylene chain containing between about 10 and 30 oxyethylene groups, and from 0 to about 3 percent by volume of water.

3. A brine-dispersible corrosion-inhibiting composition comprising from about 10 to 80 percent by volume of a corrosion inhibitor consisting of approximately equal parts by weight of an amine and an organic acid, said amine containing at least 12 carbon atoms per molecule and said acid containing at least 10 carbon atoms per molecule; about 10 to 80 percent by volume of a distilled petroleum fraction having as A. S. T. M. 10 percent boiling point of at least about 400° F.; from about 2 to 10 percent by volume of an alcohol containing no more than three carbon atoms per molecule; from about 2 to 10 percent by volume of a dispersing agent having the formula R'OW' wherein R' is a straight-chain hydrocarbon radical containing from 12 to 20 carbon atoms, O is oxygen, and W' is a polyoxyethylene chain containing between about 10 to 30 oxyethylene groups; and from 0 to about 3 percent by volume of water.

4. A brine-dispersible corrosion-inhibiting composition comprising from about 35 to 65 percent by volume of a corrosion inhibitor consisting of approximately equal parts by weight of an amine and an organic acid, said amine having the formula R''NH(CH$_2$)$_3$NH$_2$ wherein R'' is a straight-chain hydrocarbon radical containing 16 to 18 carbon atoms, and said acid is produced from a normally liquid fraction of petroleum by liquid phase partial oxidation of the latter; from about 30 to 60 percent by volume of kerosene; from about 4 to 6 percent by volume of methanol; from about 4 to 6 percent by volume of the polyoxethylene ether of lauryl alcohol wherein the polyoxyethylene portion contains from about 15 to about 25 oxyethylene groups; and from 0 to about 2 percent by volume of water.

5. A brine-dispersible corrosion-inhibiting composition comprising from about 35 to 65 percent by volume of a corrosion inhibitor consisting of approximately equal parts by weight of an amine and an acid, said amine having the formula R''NH(CH$_2$)$_3$NH$_2$ wherein R'' is a straight-chain hydrocarbon radical containing 16 to 18 carbon atoms, and said acid is the nonvolatile residue, containing long-chained carboxylic acids, remaining from the vacuum distillation of by-product acids obtained in the preparation of sebacic acid from castor oil by treatment with alkali; from about 30 to 60 percent by volume of kerosene; from about 4 to 6 percent by volume of methanol; from about 4 to 6 percent by volume of the polyoxyethylene ether of lauryl alcohol wherein the polyoxyethylene portion contains from about 15 to about 25 oxyethylene groups; and from about 0 to about 2 percent by volume of water.

6. A brine-dispersible corrosion-inhibiting composition comprising from about 10 to 80 percent by volume of an oil-soluble, water-insoluble corrosion inhibitor, from about 10 to 80 percent by volume of an aromatic hydrocarbon liquid and from about 2 to 10 percent by volume of a dispersing agent having the formula ROW, wherein R is a non-aromatic hydrocarbon radical containing at least 12 carbon atoms, O is oxygen and W is a polyglycol containing at least 4 ether linkages.

7. A brine-dispersible corrosion-inhibiting composition comprising from about 10 to 80 percent by volume of a liquid oil-soluble, water-insoluble corrosion inhibitor, from about 10 to about 80 percent by volume of an aromatic hydrocarbon liquid, from about 2 to 10 percent by volume of a dispersing agent having the formula R'OW' wherein R' is a straight-chain hydrocarbon radical containing from about 12 to 20 carbon atoms, O is oxygen, and W' is a polyoxyethylene chain containing between about 10 and 30 oxyethylene groups, and from 0 to about 3 percent by volume of water.

8. A brine-dispersible corrosion-inhibiting composition comprising from about 10 to 80 percent by volume of a corrosion inhibitor consisting of approximately equal parts by weight of an amine and an organic acid, said amine containing at least 12 carbon atoms per molecule and said acid containing at least 10 carbon atoms per molecule; about 10 to 80 percent by volume of an aromatic hydrocarbon liquid, from about 2 to 10 percent by volume of a dispersing agent having the formula R'OW' wherein R' is a straight-chain hydrocarbon radical containing from 12 to 20 carbon atoms, O is oxygen, and W' is a polyethylene chain containing between about 10 and 30 oxyethylene groups; and from 0 to about 3 percent by volume of water.

9. A method of inhibiting corrosion in a well producing liquids containing a substantial percentage of water comprising introducing into said well a brine-dispersible corrosion-inhibiting composition comprising from about 10 to 80 percent by volume of a liquid, oil-soluble, water-insoluble corrosion inhibitor, from about 10 to 80 percent by volume of a distilled petroleum fraction, from about 2 to 10 percent by volume of a mutual solvent for water and said petroleum fraction, from about 2 to 10 percent by volume of a dispersing agent having the formula R'OW' wherein R' is a straight-chain hydrocarbon radical containing from 12 to 20 carbon atoms, O is oxygen, and W' is a polyoxyethylene chain containing between about 10 to 30 oxyethylene groups, and from about 0 to about 3 percent by volume of water.

10. A method of inhibiting corrosion in a well producing liquids containing a substantial percentage of water comprising introducing into said well a brine-dispersible corrosion-inhibiting composition comprising from about 10 to 80 percent by volume of a liquid oil-soluble, water-insoluble corrosion inhibitor, from about 10 to about 80 percent by volume of an aromatic hydrocarbon liquid, from about 2 to 10 percent by volume of a dispersing agent having the formula R'OW' wherein R' is a straight-chain hydrocarbon radical containing from 12 to 20 carbon atoms, O is oxygen, and W' is a polyoxyethylene chain containing between about 10 and 30 oxyethylene groups, and from 0 to about 3 percent by volume of water.

11. A method of inhibiting corrosion in a well producing liquids containing a substantial percentage of brine comprising mixing one part by volume of a brine-dispersible corrosion inhibiting composition with at least one part by volume of said brine, and introducing the mixture into said well, said corrosion-inhibiting composition comprising from about 10 to 80 percent by volume of a liquid, oil-soluble, water-insoluble corrosion inhibitor, from about 10 to 80 percent by volume of a distilled petroleum fraction, from about 2 to 10 percent by volume of a mutual solvent for water and said petroleum fraction, from about 2 to 10 percent by volume of a dispersing agent having the formula R'OW' wherein R' is a straight-chain hydrocarbon radical containing from 12 to 20 carbon atoms, O is oxygen, and W' is a polyoxyethylene chain containing between about 10 and 30 oxyethylene groups, and from 0 to about 3 percent by volume of water.

12. A method of inhibiting corrosion in a well producing liquids containing a substantial percentage of brine comprising mixing one part by volume of a brine-dispersible corrosion inhibiting composition with at least one part by volume of said brine, and introducing the mixture into said well, said corrosion-inhibiting composition comprising from about 10 to 80 percent by volume of a liquid oil-soluble, water-insoluble corrosion inhibitor, from about 10 to about 80 percent by volume of an aromatic hydrocarbon liquid, from about 2 to 10 percent by volume of a dispersing agent having the formula R'OW' wherein R' is a straight-chain hydrocarbon radical containing from 12 to 20 carbon atoms, O is oxygen, and W' is a polyoxyethylene chain containing between about 10 and 30 oxyethylene groups, and from 0 to about 3 percent by volume of water.

13. A method of inhibiting corrosion in a well producing a substantial percentage of both brine and oil in the liquids produced comprising mixing one part by volume of a brine-dispersible corrosion inhibiting composition with sufficient of the liquids produced by said well to provide at least one part by volume of brine, and introducing the mixture into said well, said corrosion-inhibiting composition comprising from about 10 to 80 percent by volume of a liquid, oil-soluble, water-insoluble corrosion inhibitor, from about 10 to 80 percent by volume of a distilled petroleum fraction, from about 2 to 10 percent by volume of a mutual solvent for water and said petroleum fraction, from about 2 to 10 percent by volume of a dispersing agent having the formula R'OW' wherein R' is a straight-chain hydrocarbon radical containing from 12 to 20 carbon atoms, O is oxygen, and W' is a polyoxyethylene chain containing between about 10 and 30 oxyethylene groups, and from 0 to about 3 percent by volume of water.

References Cited in the file of this patent

UNITED STATES PATENTS

| | | |
|---|---|---|
| 1,854,898 | Gill et al. | Apr. 19, 1932 |
| 2,356,254 | Lehmann et al. | Aug. 22, 1944 |
| 2,649,415 | Sundberg et al. | Aug. 18, 1953 |
| 2,671,757 | Wisherd | Mar. 9, 1954 |

UNITED STATES PATENT OFFICE

CERTIFICATE OF CORRECTION

Patent No. 2,839,465                                June 17, 1958

Loyd W. Jones

It is hereby certified that error appears in the printed specification of the above numbered patent requiring correction and that the said Letters Patent should read as corrected below.

Column 2, line 52, for "members" read -- numbers --; column 9, line 57, for "10 to 30" read -- 10 and 30 --; column 10, line 5, for "16 to 18" read -- 16 to 18 carbon --; line 33, strike out "about"; line 48, for "polyethylene" read -- polyoxyethylene --; line 64, for "10 to 30" read -- 10 and 30 --; same line, strike out "about", first occurrence.

Signed and sealed this 9th day of September 1958.

(SEAL)
Attest:

KARL H. AXLINE                                           ROBERT C. WATSON
Attesting Officer                                    Commissioner of Patents